Nov. 19, 1929.    E. B. WILFORD    1,736,300
AIRPLANE
Filed Dec. 13, 1927    4 Sheets-Sheet 2
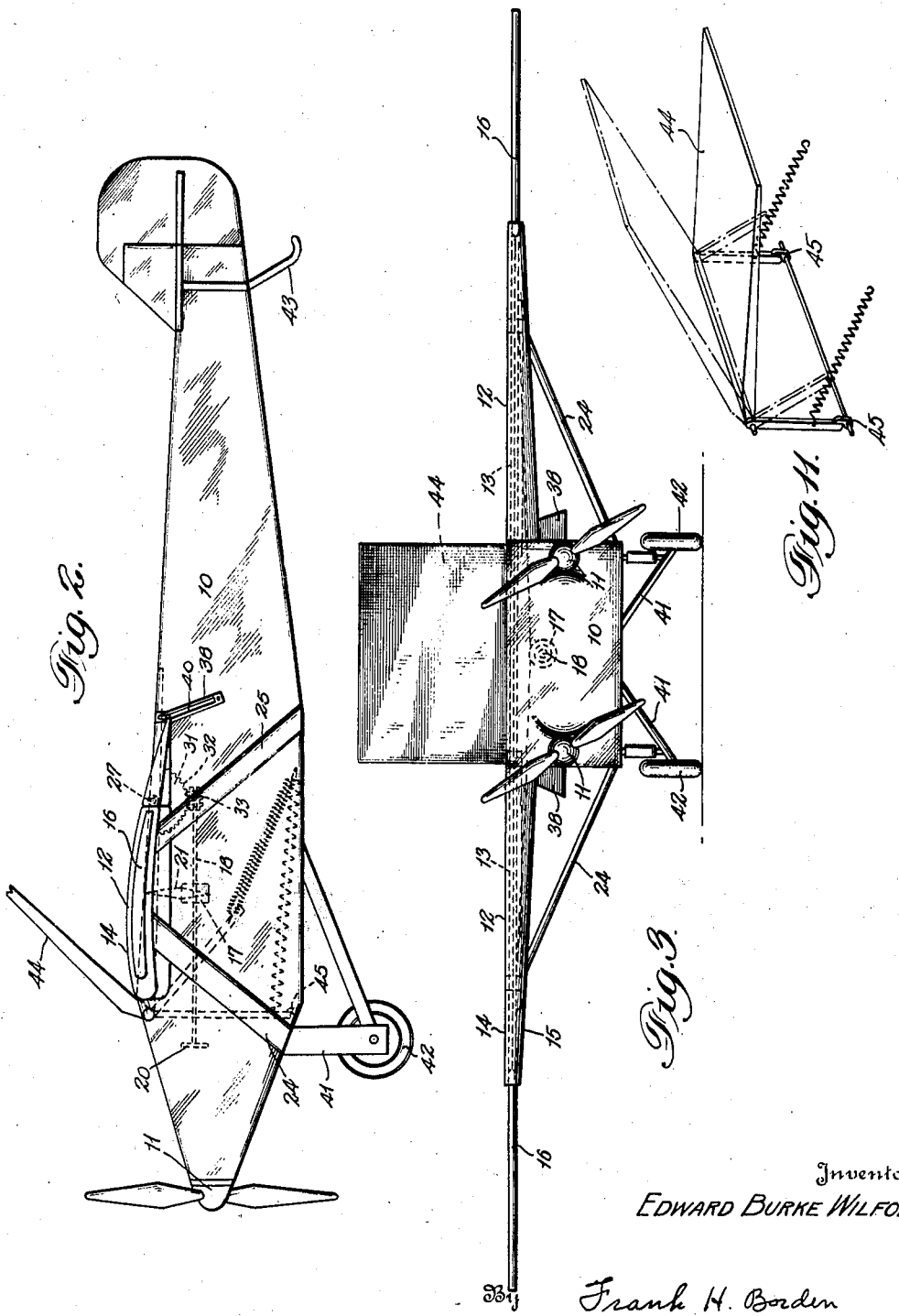
Inventor
EDWARD BURKE WILFORD
By Frank H. Borden
Attorney Nov. 19, 1929.  E. B. WILFORD  1,736,300
AIRPLANE
Filed Dec. 13, 1927  4 Sheets-Sheet 3

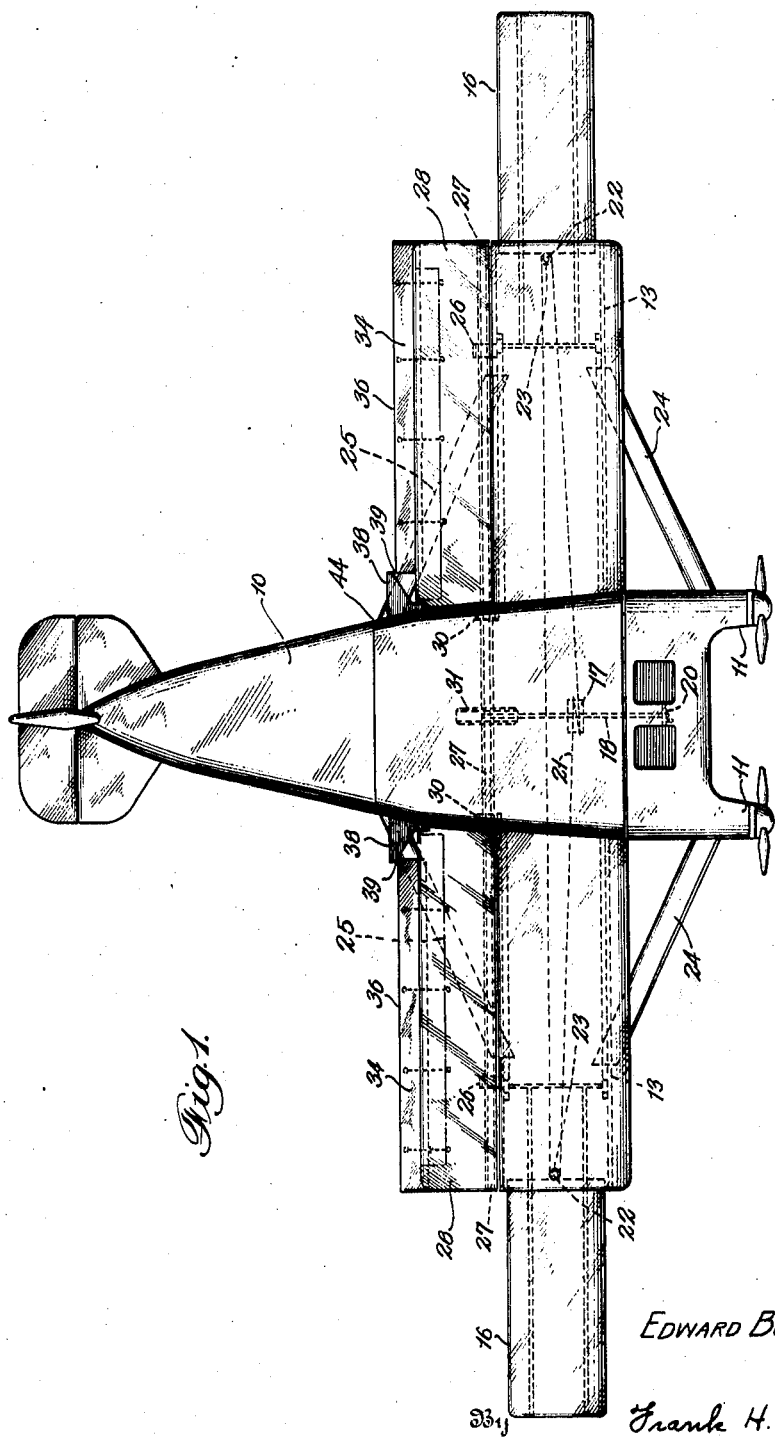

Inventor
EDWARD BURKE WILFORD.
By Frank H. Borden
Attorney

Nov. 19, 1929.         E. B. WILFORD         1,736,300
                          AIRPLANE
                  Filed Dec. 13, 1927      4 Sheets-Sheet 4

Inventor
EDWARD BURKE WILFORD
By Frank H. Borden
Attorney

Patented Nov. 19, 1929

1,736,300

UNITED STATES PATENT OFFICE

EDWARD BURKE WILFORD, OF MERION, PENNSYLVANIA, ASSIGNOR OF ONE-HALF TO JOHN S. WILFORD, OF PHILADELPHIA, PENNSYLVANIA

AIRPLANE

Application filed December 13, 1927. Serial No. 239,769.

This invention relates to airplanes, and particularly to braking devices therefor.

Among the objects of the invention are; to provide in an airplane a plurality of co-operating braking devices for retarding the motion of the airplane; to provide means for varying the camber of an airfoil simultaneously with an increase in its chord; to provide means for oscillating a wing section of an airplane to vary the angle of incidence of the wing or to effect a drag on the air for a braking action; to provide in combination with braking devices on the landing gear means to eliminate or overcome the lift of the wings so as to render such braking devices effective; to provide aircraft with a primary braking medium, and a secondary braking device responsive to the primary medium; to provide an airfoil in which a section is movable, and in which the area is variable in response to such movement; to improve the construction of airplanes generally, and many other objects and advantages as will be more apparent as the description proceeds.

In carrying out the invention in an illustrative form, but which may be subject to wide variations according to the invention as recited in the claims, I provide a monoplane with a section pivotally mounted for oscillation under the control of the pilot, an edge of the section being, if desired, arranged for extension from the section to increase the area of the section but which is susceptible to upward swinging to eliminate, kill or overbalance the lift component of the entire wing to force the airplane in contact with the ground and thus eliminate porpoising, and in which additional braking means may be mounted on the landing gear and rendered effective by the elimination or overbalancing of lift as noted.

In the accompanying drawings, Fig. 1, represents a top plan of an airplane according to the invention;

Fig. 2, represents a side elevation of the same;

Fig. 3, represents a front elevation of the same;

Fig. 11, represents a detail of a lift nullifying surface.

Figure 4:
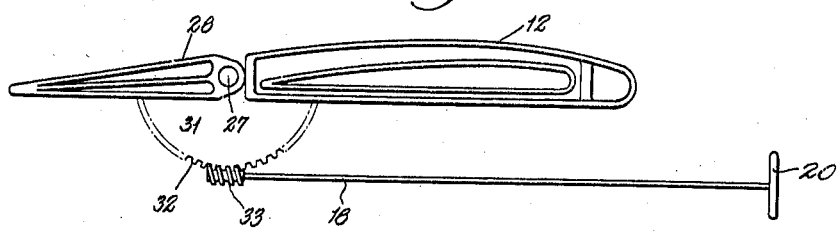
Figs. 4, 5 and 6 represent diagrammatic sections of a wing and the movable section in several adjusted positions.
Figure 5:
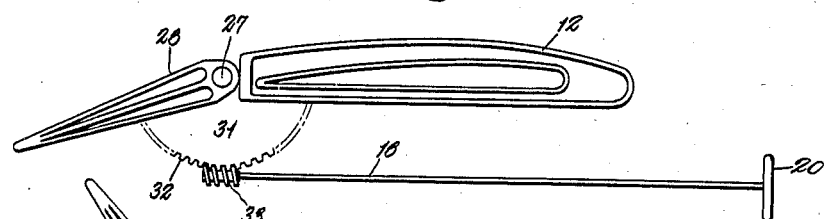
Figure 6:
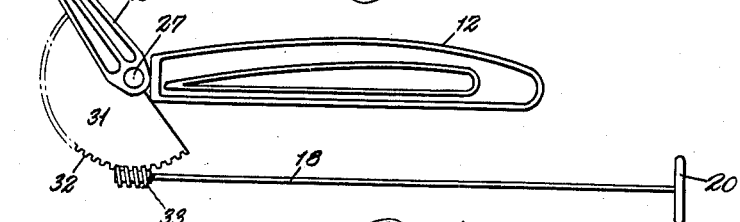
Figure 7:
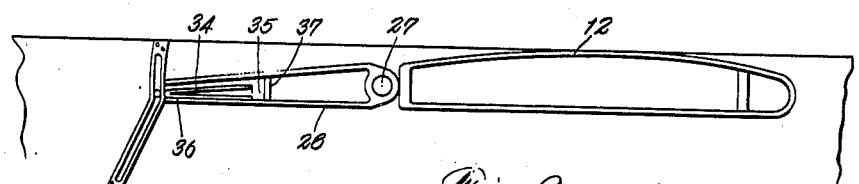
Figs. 7 and 8 represent diagrammatic sections through a wing according to the invention in two different phases of flight as to adjustment in camber and in area.
Figure 8:
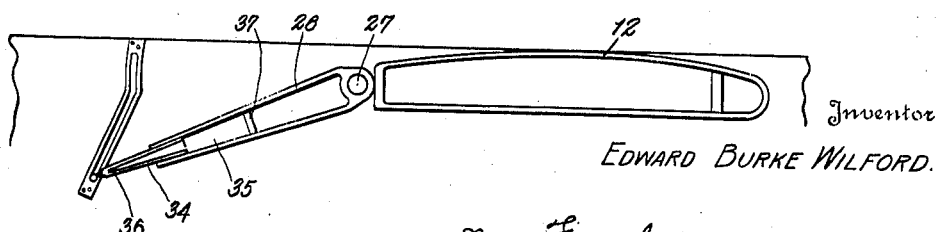
Figure 9:
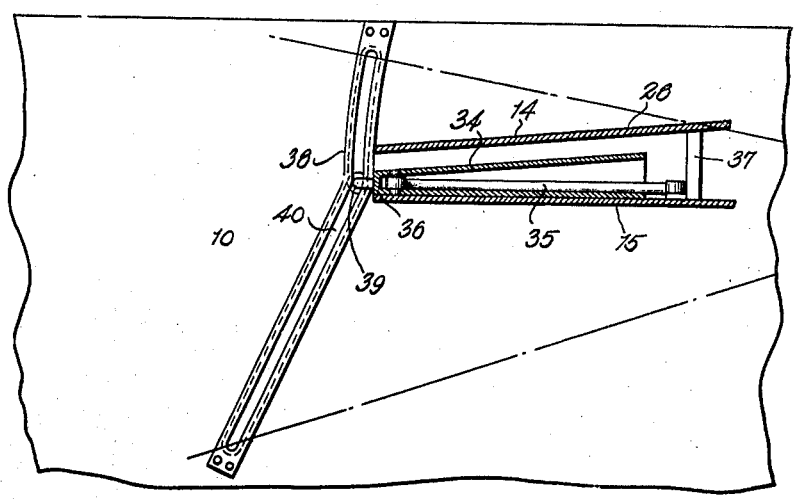
Fig. 9, represents a detail on a large scale.
Figure 10:
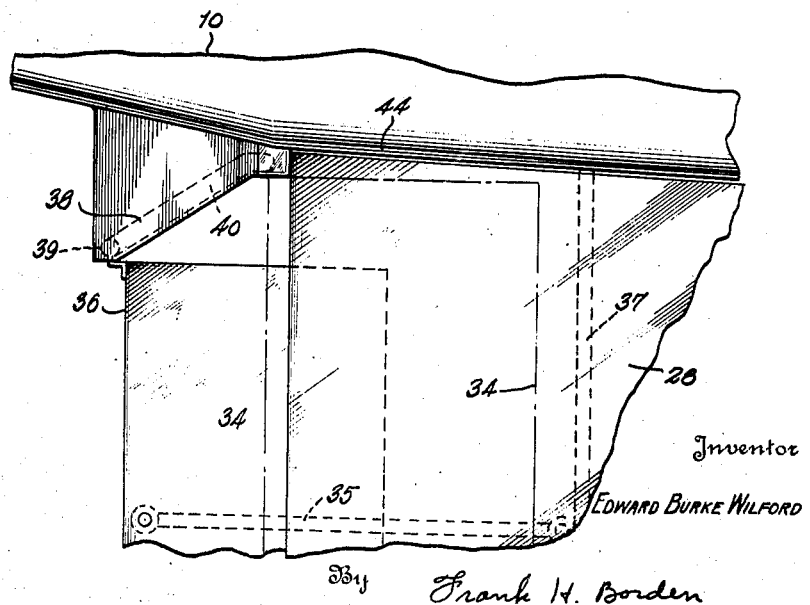
Fig. 10, represents a detail on a large scale.

Although the invention is shown as embodied in a monoplane, yet this is purely illustrative and it may also be embodied in a multiplane craft, and may also be varied in dimensions, proportions, etc. to meet particular requirements within the terms of the appended claims.

Referring now to the drawings the fuselage 10, preferably of the "Burnelli" type is arranged to receive two motors indicated at 11, as a safety factor so that failure of one motor will not necessarily cause falling of the aircraft. Extending laterally from the fuselage at opposite sides of the fuselage are the permanent rigid wing sections 12, suitably braced internally and supported by the main spars 13 shown in dotted lines, but preferably provided with an internal recess between the upper surface 14 and lower surface 15 to receive the auxiliary wing sections 16, arranged for telescopic association with the rigid sections, and susceptible to extension laterally of the fuselage by any desired means operable by the pilot or operator in the fuselage. Such means may comprise a drum 17 mounted on a shaft 18 actuated through handle 20, and a cable 21 frictionally actuated through the drum passes over rollers 22 in the ends of the rigid wing sections, having lugs 23 engaging the extensible wing sections 16, and retracting or extending them according to the direction of rotation of the shaft 18 and drum 17. Although the specific extensible wing elements 16 shown form no part of the present invention, yet the means for effecting a variation in the area of the wing under the control of the pilot shown are to be considered in connection with other devices to be described later also under control of the pilot as contributing factors in the decrease of the speed of the aircraft.

Braces or reinforcing struts may be angularly disposed between the fuselage and the rigid wing sections, as front struts 24, and rear struts 25, to absorb shocks and to strengthen the wings and to preclude flutter of the wing sections. Front struts 24 are connected with the spar 13 in the entering edge of the rigid wing sections and extend forwardly and downwardly, and rear struts 25 are connected with the rear spar 13 of the rigid sections extending rearwardly and downwardly. The rear edge of the rigid sections is not a trailing edge, but as shown in the sectional views is of appreciable thickness, and is arranged to receive a detached and movable trailing edge which is variable as regards the angle formed with the rigid section to vary the camber of the wing and also when elevated about the pivot to be described interposes a barrier to the passage of the plane through the air and simultaneously eliminates, nullifies or overbalances the lift component of the unit airfoil. Clearly this variable lift factor can be availed of for stabilization, that is, each wing can be used as an aileron if controlled differentially or independently of the other wing.

The rear end of the rigid sections, toward the longitudinal end thereof, supports a roller bearing 26 through which a tubular spar 27 is extended for rotation therein, and which carries rigidly a trailing edge section 28 arranged for oscillation with the spar 27. Additional roller bearings 30 are mounted in the fuselage in alignment with the roller bearings 26, and through which the tubular spar is extended. The tubular spar is preferably a single spar extending from one wing tip through the journals and through the fuselage to the other wing tip, suitably stopped against endwise or longitudinal movement and supporting rigidly the sector or segment 31, having teeth 32 in mesh with a worm 33 carried on the end of the shaft 18. It will be evident that rotation of the shaft 18 will, through the instrumentalities described or other means simultaneously vary the angle between the trailing edge and the rigid wing section so as to vary the camber thereof, and also will extend or retract the telescopic sections 16 so as to vary the area of the wing supporting the fuselage. The assembly comprises means for simultaneously varying the camber and area of the wing or airfoil. It is preferred, however, to utilize additional means for this end, by forming the trailing edge section with an extensible portion. This latter means may be the only area varying device used, or it may be combined with the telescopic extensions in the wing tips.

In carrying out this phase of the invention, the entire trailing edge section 28, or a portion only thereof as may be desired leaving a rigid wing portion for the mounting of ailerons if found desirable, comprises a thin edge element 34 supported by links 35, pivoted thereto in a spar element 36 thereof, and movable longitudinally of the trailing edge section 28 and inwardly thereof and therein, so as to shorten the chord of the entire wing assembly when in telescoped position. The links 35 being pivoted to the spar 37 of the trailing edge section so that when the edge element is moved longitudinally in the other direction the links assume a position substantially perpendicular to the spar 37 of the trailing edge section 28. At this point the thin edge section is extended along the chord line to increase the area of the trailing edge section, and thus of the entire wing.

To effect this extension of the trailing edge section upon the oscillation of the pivoted element thereof, an inclined track 38 is provided on the side of the fuselage, or at some other desired point, with which a roller 39, mounted on the end of the spar element 36 of the thin edge section, contacts, and so arranged that oscillation of the trailing edge section imparts pressure to the roller from the inclination of the track, thus simultaneously varying the angle of attachment of the trailing edge section and the rigid section of the wing, so that the chord, camber and span of the wing are simultaneously varied.

The track 38 may be constituted of a member having a cam slot 40, as shown within which the roller travels and thus imparts positive longitudinal movement to the thin edge in both directions as the trailing edge section is oscillated relative the rigid section and the fuselage.

The landing gear 41 disposed beneath the fuselage includes wheels 42, each of which has a braking device of any desired sort not shown, actuated from within the fuselage by the pilot, either independently of the other controls of the airplane, in any desired manner, or by mechanism actuated with and in synchronism with the main control shaft 18 and a tail skid 43. In this latter form of construction it is preferred that the braking devices on the wheels be susceptible to independent operation, but that they operate upon the oscillation of the wing section vertically on its pivot on the oscillatable spar.

In order to increase the effective lift component in taking off, and in landing, it is contemplated that the camber of the wings will be increased by lowering the trailing edge section and simultaneously by increasing the area of the wings so that the unit load per square foot of wing area will be reduced. This may be effected either by the extensible trailing edge section, or by the laterally extensible telescoping wing sections, or both, so that the lift is high and the take-off is effected with but little run, as the landing speed is reduced to a small minimum by the same agencies. Once safely in the air the camber and area of the wings is reduced so that the trailing edge section instead of being at 15° from the chord as it may easily be for the increased lift desired at the take-off, may rotate up to 2° or at any minus angle relative thereto. It is understood, of course, that counterbalancing areas may be disposed as desired relative the movable trailing edge section so as to render the operation of the actuating mechanism an easy matter. It is also to be understood that the operating mechanism may also include a motor of desirable construction and motive power such as will enable the rapid rotation of the shaft 18, and the oscillation of the spar carrying the wing section having power sufficient to overcome the resistance that may be encountered.

The operation of the pivoted trailing edge for taking-off and landing and in full flight has been explained. Assume that the landing at low speed by increasing the camber and area of the airfoils has been consummated, at least to the point where contact has been established between the wheels of the landing gear and the ground. Then, either by spinning the shaft 18 in the proper direction, or by an independent mechanism permitting the movement by direct pull on a lever positioned for the pilot, (not shown) the trailing edge section is swung upwardly on its horizontal pivot to effect a drag to the passage of the airplane through the air, and which "kills" the lift, so that the full weight of the airplane, or more than its weight is carried by the wheels of the landing gear, and simultaneously the brakes on the wheels are actuated so that the quick stop and short roll desired, if planes are to land in small fields, is achieved. In this connection, it will be obvious that for effective working of the brakes on the wheels it is essential that traction be established between the wheels and the ground. This is positively afforded by the elimination or overbalancing of the lift component of the wings as described, so that the brakes may function properly.

It is to be clearly understood that the upward movement of the pivoted wing section is not necessarily the only way of achieving the desired lift elimination or counterbalance. For instance, it is contemplated that it will be desirable to maintain the high camber and large area of the wing for the slow landing and to maintain this formation or position of the parts during the actual stopping of the airplane. In this case it is contemplated that additional means be provided, such as the entire skin surface of the wing or its trailing edge, or the upper skin portions of the fuselage such as 44 or the side or lower skin surfaces thereof which may be swung up against the air stream to increase the drag and to kill, counterbalance or overcome the lift and which may be effected by a separate lever or spring and trigger mechanism 45 under the control of the pilot. Thus the retardation of the flight, the nullification of the lift, and the increase in the traction of the wheels on the ground, and of the dragging action of the brakes on the wheels, may all be consummated without disturbing the high lift and wide area of the wings resulting in the slow landing.

It is to be noted that the utilization of such skin surfaces, as the lift nullifying surface, is of additional value as it is so disposed to the rear of the center of gravity of the airplane that the components of the pressures on the lift overbalancing or overcoming surfaces are downward and to the rear, thus forcing the tail down simultaneously with an increase in pressure of the landing gear wheels upon the ground preventing the airplane from nosing over upon the application of the wheel brakes, and also preventing the "porpoising" normally encountered in other attempts to utilize flap surfaces as retarding surfaces and insuring that an established ground contact is not broken and to render positive the action of the wheel brakes.

It will be understood that with the invention recited "stall" landings will be possible, and that as soon as contact is established with the ground the wheels may be retarded by their brakes and simultaneously or in advance thereof the lift will be nullified by the angular inclination of such an area as mentioned, to increase the traction of the wheels to a degree amply sufficient to secure the desired effectiveness of the wheel brakes. The brakes and the drag increasing and lift eliminating or nullifying surfaces are preferably synchronized and operable through a common lever, gear or other mechanism, and may be caused to operate automatically upon contact with the ground by the wheels.

I claim as my invention:

1. In an airplane, a body, a stationary wing section, a pivoted wing section and a laterally movable thin edge section telescopically associated with the pivoted wing section; means under the control of the pilot for moving the pivoted section, and means associated with the end of the thin edge section for imparting lateral movement thereto as the pivoted section is actuated, and pivot means responsive to such lateral movement to extend the thin edge section relatively to the pivoted section.

2. In aircraft, a body; an airfoil carried by the body; a section of the airfoil being pivoted for movement relatively to the body; a longitudinally movable thin edge arranged for telescoping association with the section through link connections therewith; means in the body for actuating the section on its pivot; and means mounted on the body engaging the thin edge and imparting longitudinal movement thereto as the section is moved on its pivot.

3. In an airplane, a body, a monoplane wing mounted thereon, a flap carried thereby, a spar supporting the flap for pivotal movement relative the wing, a worm and sector connection for the spar disposed in the body for actuation by the pilot, and means carried by the flap for extending the area thereof upon movement of the spar.

Signed at Philadelphia, county of Philadelphia, State of Pennsylvania, this first day of November, 1927.

EDWARD BURKE WILFORD.